United States Patent [19]

Erdley

[11] 4,126,046
[45] Nov. 21, 1978

[54] TWICE SPIN FREQUENCY ROTATING FILTER

[75] Inventor: Harold F. Erdley, Pacific Palisades, Calif.

[73] Assignee: Teledyne Industries, Inc., Los Angeles, Calif.

[21] Appl. No.: 858,711

[22] Filed: Dec. 8, 1977

Related U.S. Application Data

[63] Continuation-in-part of Ser. No. 710,693, Aug. 2, 1976, Pat. No. 4,082,005, which is a continuation-in-part of Ser. No. 608,770, Aug. 25, 1975, Pat. No. 3,974,701.

[51] Int. Cl.² .................. G01C 19/16; G01P 15/02
[52] U.S. Cl. ............................ 73/504; 74/5 F; 74/5.5
[58] Field of Search ............ 73/504, 505; 74/5 F, 74/5.5

[56] References Cited

U.S. PATENT DOCUMENTS

| 3,832,906 | 9/1974 | Craig | 74/5 F |
| 3,974,701 | 8/1976 | Erdley | 73/504 |
| 4,002,078 | 1/1977 | Thomas | 74/5 F |

*Primary Examiner*—James J. Gill
*Attorney, Agent, or Firm*—Blakely, Sokoloff, Taylor & Zafman

[57] ABSTRACT

Apparatus for reducing the twice spin frequency vibration sensitivity of tuned inertial sensors by providing a twice spin frequency rotating filter thereon is disclosed. In accordance with the invention a rotating filter is supported on the shaft assembly of a tuned inertial instrument so as to rotate therewith at the spin speed. By tuning the combination of the filter rotor and the spring support thereof so as to have a natural frequency of twice sin frequency about axes perpendicular to the spin axis, the filter rotor, operating uncaged and substantially undamped, will absorb a large part of the twice spin frequency angular vibration torques imposed on the shaft assembly through bearing noise and other sources. Similarly in tuned instruments sensitive to twice spin frequency linear vibration, the filter rotor and spring suspension can be tuned so that the filter rotor has a translational natural frequency along axes perpendicular to the spin axis equal to twice spin frequency, thereby tending to absorb most of the twice spin frequency linear vibration forces imposed on the rotating system.

28 Claims, 10 Drawing Figures

TWICE SPIN FREQUENCY ROTATING FILTER

CROSS REFERENCES TO RELATED APPLICATIONS

This application is a continuation-in-part application of our copending application entitled "SPIN COUPLED, ANGULAR RATE SENSITIVE INERTIAL SENSORS WITH MOUNTING STRUCTURE AND METHOD OF FABRICATING AND MOUNTING SAME," filed Aug. 2, 1976, as Ser. No. 710,693, now U.S. Pat. No. 4,082,005, which was a continuation-in-part application of my application entitled "SPIN COUPLED, ANGULAR RATE SENSITIVE INERTIAL SENSORS WITH OPTIONAL ACCELERATION SENSING CAPABILITY AND METHOD OF FABRICATING SAME," filed Aug. 25, 1975 as Ser. No. 608,770, now U.S. Pat. No. 3,974,701.

PRIOR ART

The prior art patents describing certain types of prior art instruments and apparatus of the general type or class to which the present invention pertains includes U.S. Pat. No. 3,678,764 to H. F. Erdley, et al.; U.S. Pat. No. 3,354,726 to W. J. Krupick, et al.; U.S. Pat. No. 3,301,073 and U.S. Pat. No. 3,702,568 to E. W. Howe; U.S. Pat. No. 3,832,906 to R.J.G. Craig; U.S. Pat. No. 3,543,301 to D. Barnett; and U.S. Pat. No. 3,700,290 to W. B. Ensinger. Pertinent publications include the article entitled "Dynamically Tuned Free Rotor Gyroscope" published in Control Engineering of June, 1964 pages 67–72 (A. W. Howe) and AIAA Paper No. 65-435 delivered at the AIAA meeting in San Francisco, CA, July 26–29, 1965, the paper entitled "Dynamics of Ideal Suspensions Applied to Rotating Bodies in Space."

As the foregoing prior art discloses, various mechanizations of rotating, mechanically tuned suspension systems have been successfully employed as the fundamental supporting means for precision inertial instruments, principally gyroscopic rotors having two degrees of freedom. These suspension systems are generally made up of one or more tuned gimbal-torsion spring support combinations, which ideally result in a zero value for one of the two dynamic natural frequencies of the rotating system, and a value of slightly lower than twice the rotation frequency for the other natural frequency, the nutation frequency.

Since the desired response of this type of inertial sensor is centered at zero frequency, any nutation frequency motions are not only of no value, but may cause distortion, rectification, and other errors in the lower frequency output measurements if not suitably damped. This damping is generally carried out by a combination of mechanical and control system (instrument capture loop or gimbal servo) design methods.

While this type of mechanization of inertial sensor has proven to be useful for a wide variety of applications, certain fundamental performance limitations exist. These include the common inertial sensor sensitivities to acceleration induced error torques (in association with mass unbalance and anisoelasticity conditions) and other low frequency error torques, such as magnetic and windage induced torques, as well as a class of error torques which is primarily associated with tuned suspension system sensors, namely the twice spin frequency rectifications of both angular and translational input motions. This class of error torques is generally of sufficient magnitude to necessitate both the employment of more than one gimbal and associated torsion spring suspension element per instrument and the associated careful balancing and adjustment methods required to insure effective cancellation of the effects.

Because all of the above mechanizations of inertial sensors are limited to two axes of information (centered about zero frequency) a total of two such sensors are required to provide all three axes of angular rate information. In addition, either two or three separate accelerometers are required for most inertial system requirements. Alternatively, three, two-axis gyro sensors, at least two of which are pendulous (built with a specific mass unbalance along the rotation axis) are required to supply sufficient information from which can be derived all three axes of angular rate and linear acceleration.

Another mechanization of the mechanically tuned suspension system exists in which the two natural frequencies of the instrument are adjusted to slightly greater than zero and (ideally) to precisely twice the rotation frequency. By a proper selection of the mechanical parameters of the instrument, including unequal moments of inertia of the rotor about the two principal axes orthogonal to the rotation axis, the response of the instrument centered at twice the rotation frequency is ideally a function of low frequency angular rate inputs only and is not a function of the usually troublesome low frequency torques. However, such a mechanization is sensitive to twice spin frequency angular rate and linear vibrational input rectification. This sensitivity has been the fundamental limitation to the practical exploitation of this gyro concept, in as much as the means for cancellation of these effects which are used for the more conventional mechanization, described previously, do not apply here.

Apparatus for cancellation of twice spin frequency angular rate and linear vibrational input sensitivities of instruments having a suspension system tuned to twice spin frequency is described in my U.S. Pat. No. 3,974,701. That apparatus and the method of employing it are generally referred to as spin coupling, and allow the generation of correction torques controllable in magnitude and position and dependent upon the same twice spin frequency angular and linear vibration inputs so that the net effect of such vibrational inputs may be adjusted to be substantially zero. As described in that patent, the control of the sensitivity of such an instrument to twice spin frequency vibrations grossly improves the performance of angular rate sensors of the class having their suspension systems tuned to twice the spin frequency. This allows the practical implementation of inertial grade sensors for producing two axes angular rate information and two axes of acceleration information utilizing a single sensitive element having a spin axis mass unbalance to provide the acceleration sensitivity centered at zero frequency. However, as pointed out in that patent, the spin axis mass unbalance introduced to provide the desired zero and low frequency acceleration sensitivity also causes twice spin frequency linear vibration induced disturbances of the sensitive element at zero frequency and twice spin frequency. While spin coupling may be used to adjust out either the zero frequency or the twice spin frequency rotor disturbance, both could not be adjusted simultaneously by the spin coupling technique. Accordingly, additional or other techniques for enhancing the performance of such instruments are desirable, such as those described in my copending application, Ser. No. 710,693, filed Aug. 2, 1976 and entitled "Spin Coupled, Angular Rate Sensitive Inertial Sensors With Mounting Structure and Method of Fabricating".

Another method of cancelling twice spin frequency angular vibration induced errors in tuned sensors is to provide a second rotor to sense the error causing vibration, and to torque the entire rotating system at twice spin frequency in response thereto to quell the twice spin frequency vibration on the rotating system, as is described in U.S. Pat. No. 3,805,625. Such a technique is apparently theoretically sound, though the twice spin frequency rotating system torquer requirements may be large unless the methods disclosed in my copending application for reducing the bearing noise driving forces are also incorporated. More important, however, is the fact that the net result of that system is that two rotors, each complete with a suspension system, two axis sensors, two axis torquers and associated caging loops are required to provide only two axes of rate information, while in the present invention a single rotor with a single suspension system and associated sensors and torquers may be used to provide two axes of rate and two axes of acceleration information, i.e., twice the information for nearly one half the complexity.

BRIEF SUMMARY OF THE INVENTION

Apparatus for reducing the twice spin frequency vibration sensitivity of tuned inertial sensors by providing a twice spin frequency rotating filter thereon is disclosed. In accordance with the invention a rotating filter is supported on the shaft assembly of a tuned inertial instrument so as to rotate therewith at the spin speed. By tuning the combination of the filter rotor and the spring support thereof so as to have a natural frequency of twice spin frequency about axes perpendicular to the spin axis, the filter rotor, operating uncaged and substantially undamped, will adsorb a large part of the twice spin frequency angular vibration torques imposed on the shaft assembly through bearing noise and other sources. Similarly in tuned instruments sensitive to twice spin frequency linear vibration, the filter rotor and spring suspension can be tuned so that the filter rotor has a translational natural frequency along axes perpendicular to the spin axis equal to twice spin frequency, thereby tending to adsorb most of the twice spin frequency linear vibration forces imposed on the rotating system.

The effectiveness of the filter rotor may be enhanced by combining the apparatus of the present invention with an effectively soft mount of the stationary portion of the spin bearings. The apparatus and techniques of the present invention may be applied to substantially any tuned rotating inertial sensor, and is particularly advantageous when applied to tuned instruments of the type having an inertially unsymmetrical rotor spring restrained about two orthoganal axes with respect to and perpendicular to the spin axis, tuned so that the upper rotating frequency is equal to twice spin frequency and having a predetermined axial unbalance of the rotor element. If desired the apparatus and principles of the present invention may further be applied to tuned instruments incorporating the principles of spin coupling described in detail in U.S. Pat. No. 3,974,701.

DETAILED DESCRIPTION OF THE INVENTION

Figure 1:
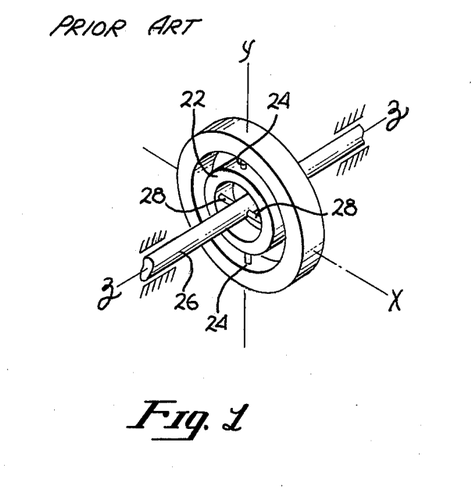
FIG. 1 is a perspective view of one prior art rotor suspension system for a tuned inertial instrument.

First referring to FIG. 1, a perspective illustration of one prior art rotor suspension system may be seen. This system is that of E. W. Howe, described in detail in his prior patents and publications hereinbefore identified. The systemm is comprised of a rotor 20 supported from a gimbal 22 by a pair of torsion spring members 24 so as to allow relative spring restrained rotation between the rotor 20 and the gimbal 22 along the y axis. The gimbal 22 in turn is supported on a shaft 26 by a pair of torsion springs 28 so as to allow relative spring restrained angular rotation therebetween along the x axis. (The x and y axes representing a rotor fixed rotating coordinate system.) By the proper selection of the torsion spring rates and suitable adjustment of the inertia of the gimbal, the dynamics of the system will cancel the spring rate of the suspension system, so that the rotor will behave as a free rotor. The problem with this type of instrument however, is that the suspension system is sensitive to twice spin frequency angular vibration of the shaft having components about any case fixed axis orthogonal to the spin axis. These sensitives, coupled with the normally experienced twice spin frequency angular vibration of the shaft caused by the spin bearings (and the vibrations thereof caused by enviromental effects, etc.) prevent the direct application of this configuration to navigational grade instruments.

Figure 2:
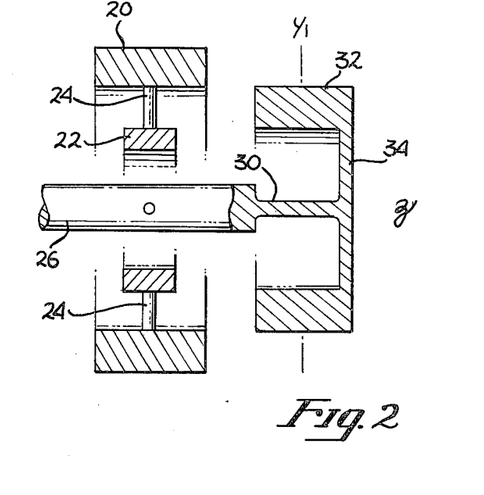
FIG. 2 is a schematic cross-section of the system of FIG. 1 further incorporating the apparatus of the present invention.

Now referring to FIG. 2, a cross section of the present invention as coupled to a rotor suspension system of the general type shown in FIG. 1 may be seen. In addition to the suspension spring elements, rotor and gimbal supported by the shaft 26, there is also a spring element 30 coupled thereto which in turn supports a member 32. Generally in this form the member 32 will be a body of revolution, with the spring element 30 constituting a rod or bar-like extension of member 32 of circular cross section. Using a new coordinate system $x_1$, $y_1$, $z$ through the center of gravity of the member 32, it will be noted that the moments of enertia about the $x_1$ axis and the $y_1$ axis are equal, that the translational spring rate along the $x_1$ and $y_1$ axes are equal, and that the torsional spring rates of member 30 about the $x_1$ and $y_1$ axes are equal. To achieve the objects of the present invention in this configuration, the translational natural frequency of member 32 along any axis perpendicular to the spin axis is tuned to be equal to twice spin speed. In general the tuning condition will be met when the mass $M_a$ of the vibration absorber member 32 is adjusted with respect to the translational spring constant $K_t$ of element 30 so that $M_a = K_t/4N^2$, where $N$ = spin frequency.

In addition, the combination of members 30 and 32 are tuned so that one of the natural frequencies of element 32 about any axis perpendicular to the z axis is equal to twice spin frequency when rotating about the z axis at spin speed. In particular, in the preferred embodiments the upper natural frequency of member 32 is set equal to twice spin frequency, whereby the tuning condition is established by the following equation:

$$K_\theta = 2N^2 (2A_2 - C_2) \quad (1)$$

where $K_\theta$ is the angular spring rate of member 30 about any axis in the $x_1$, $y_1$ plane, N is the spin frequency, $A_2$ is the moment of inertia of element 32 about any axis in the $x_1$, $y_1$ plane and passing through the spin axis, and $C_2$ is the polar moment of inertia of element 32 about the z axis.

It can be shown that the foregoing tuning equations are met, assuming members 30 and 32 are bodies of revolution and that the mass of member 30 and of end plate 34 is small, when the spring member 30 is equal in length to member 32. Thus, in general member 30 may be an elongated spring member having a length approximately equal to member 32. Also, it should be noted that in general the lower natural frequency of member 32 about the $x_1$ and $y_1$ axes will depend upon the effective length of member 32 along the z axis. In particular, given a tuning of the upper natural frequency to twice spin speed, a relatively short member 32 would result in the lower natural frequency being quite low in comparison to spin speed, with a member 32 having the very approximate proportions shown in FIG. 2 having a lower natural frequency on the order of seven tenths spin speed.

With the tuning described, member 32 acts as a vibration absorber, having a very substantial settling effect on the shaft 26 with respect to any forcing function encouraging the shaft to vibrate at twice spin speed along or about any axes perpendicular to the spin axis. In that regard it should be noted that the tuning conditions hereinbefore noted are the conditions for tuning element 32 with respect to the shaft 26 and not with respect to the instrument case. By way of example, the translational tuning equation hereinbefore given is dependent only upon the spring rate of element 30 and does not further consider the spring rate of the bearings supporting shaft 26, etc. Accordingly, the apparent natural frequency of element 32 as measured by providing a twice spin speed linear vibration to the instrument case will not be twice spin frequency because of the contribution of the spin bearings and other compliances and the masses supported thereby in the total assembly. However, with respect to the forces that would otherwise cause a vibration of the shaft in prior art instruments at twice spin frequency, the present invention results in the vibration of member 32 in the corresponding mode at twice spin frequency, creating a reaction force or torque through member 30 back on shaft 26 in opposition to the initial driving force.

Obviously the present invention dynamic vibration absorber tends to reduce the vibration of the shaft of a tuned instrument at twice spin frequency, thereby tending to reduce the instrument errors caused thereby, rather than generating compensating torques on the rotor as in U.S. Pat. No. 3,974,701 which allow the adjustment of the sensitivity to zero. Accordingly the present invention in this simple form will reduce but not eliminate the errors caused by the twice spin speed vibration sensitivity of this class of tuned sensors. However, control of various parameters with respect to the vibration absorber will maximize the reduction achievable even with this simple form of the invention. In particular, the damping of the vibration of element 32 at twice spin speed should be kept as low as possible, as the effective absorption achieved thereby is highly dependent on the Q of the vibration absorber in the particular vibrational mode in question. This is a relatively easy parameter to control, however, as such instruments generally operate in a reduced atmosphere so that disposition of element 32 away from any case fixed walls, etc. and careful mounting of the spring element 30 will assure minimum damping. Also member 32 should be relatively large as its effectiveness of maintaining the shaft as a node in the presence of twice spin frequency vibrational forces and torques depends on the mass and inertia of the element. While there are obvious practical limits with respect to the size of member 32 which can be accommodated in a given instrument, it is preferable to proportion the rotating portion of an instrument so that member 32 is a significant percentage of the shaft fixed rotating mass and inertia. Finally, it should be noted that normally the only significant and time varying sources of twice spin frequency forces and torques on the shaft of an instrument either come from the spin bearings thereof, or from the outside world through the spin bearings. Accordingly, as shall subsequently be described in greater detail, particularly with respect to certain other enclosed embodiments of the invention, it is preferable to relatively softly mount the non-rotating portion of the spin bearings with respect to the outside world so that noise generated within the bearings can be better confined to the non-rotating portion and not strongly forced onto the shaft in spite of the vibration absorber. As shall subsequently be seen, this may readily be accomplished by such methods as mounting the non-rotating portions of the instrument case on a tuned suspension, or alternatively mounting the non-rotating portion of the bearings in a suitably compliant mount.

It will be noted that the vibration absorber 32 is not caged and is purposely left substantially undamped with respect to the shaft, and therefore could be subjected to disturbances which would take a number of cycles to die out. The only dominant disturbance exciting either of the rotational frequencies (i.e. 2N and $\approx 0.7N$) is the spin bearing noise driving the shaft, which of course even if unsuppressed constitutes relatively small forces. Further, the lower rotational frequency of the vibration absorber in the preferred embodiment is kept upward in the vicinity of spin frequency ($\approx 0.7N$) so as to be out of the bandpass of the instrument, whereby disturbances of this frequency, to the extent they do occur, will not cause a corresponding disturbance in the instrument outputs. Also, with a configuration wherein the lower rotating frequency is on the order of spin speed, the angular spring rate of spring element 30 is relatively high, so that the angular deflection of the spin axis of the absorber element 32 from the shaft spin axis caused by normally encountered rates in strap down applications is relatively small, making the method and apparatus of the present invention applicable both to stable platform guidance systems and strap down systems alike.

Since the vibration absorber of the present invention grossly reduces the twice spin speed vibration induced errors which would otherwise be encountered by a prior art device in accordance with FIG. 1, grossly improved performance of such a device may be achieved. Also, as in my U.S. Pat. No. 3,974,701, the reduction of the twice spin speed vibration of the instrument shaft allows the use of a rotor having different inertias about the two principal axes perpendicular to the spin axis and the tuning of the rotor suspension system to twice spin frequency, so that angular rate inputs to the instrument case are sensed by the twice spin speed disturbances of the rotor. As before, by also making the rotor pendulous along the spin axis the zero frequency centered response of the rotor will be dependent upon the angular rate inputs and the linear acceleration inputs to the instrument case, so that the response of the rotor centered around zero frequency may be used to sense linear acceleration along two axes by removing the angular rate information as determined by the twice spin frequency response of the rotor from this input. Therefore highly accurate two axis rate and two axis acceleration information is obtained. Also, it should be noted that since the present invention has the effect of grossly reducing the twice spin frequency vibrations of an instrument shaft, it is directly applicable to any tuned suspension system having a sensitivity to twice spin frequency vibrations, whether or not that system may also incorporate other error compensation techniques. By way of example, as will subsequently be seen, the present invention tuned vibration absorber may be incorporated into an instrument also using the principles of spin coupling in accordance with my U.S. Pat. No. 3,974,701 to reduce the residual errors remaining from twice spin speed vibrations after the reasonable limits of adjustability of the spin coupling compensation have been achieved. Also, it can be applied to devices of the type described in my U.S. Pat. No. 3,678,764. Further, as shall subsequently be seen, it may be applied to instruments of the type wherein the rotor has a single degree of freedom with respect to the shaft and/or devices such as that shown in FIG. 1 having an inertially symmetric rotor and a suspension system tuned to provide a free rotor operation with or without a spin axis mass unbalance provided to the rotor, though in these applications the tuning of the vibration absorber is particularly simple in that, generally speaking, the translational natural frequency of the vibration absorber does not need to be tuned to twice spin frequency if the spin axis mass unbalance (zero frequency acceleration sensitivity) is not incorporated.

Figure 3:
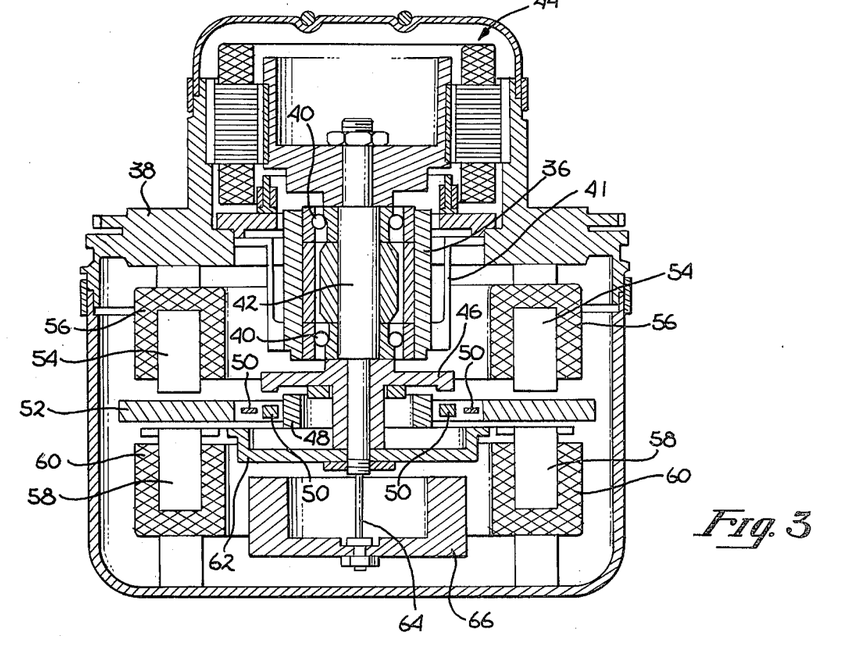
FIG. 3 is a cross-section of a tuned instrument incorporating the present invention and illustrating a relatively soft mounting of the non-rotating portion of the spin bearings.

Now referring to FIG. 3, a somewhat schematic cross-section of a practical instrument incorporating the principles hereinbefore described with respect to FIG. 2 may be seen. The basic instrument pictured is that shown in and described with respect to FIG. 5 of U.S. Pat. No. 3,974,701, and with respect to FIG. 14 of my copending application, though without incorporating the principles of spin coupling. Thus, an outer race bearing carrier 36 is coupled in the instrument frame 38 through a compliant mount 41 providing predetermined relatively low translational spring rates in directions perpendicular to the spin axis and relatively low torsional spring rates about axes perpendicular to the spin axis. Mounted within the bearing carrier 36 are a pair of spin bearings 40 supporting the shaft 42 driven in rotation by a motor assembly, generally indicated with a numeral 44, at the upper end of the instrument. Coupled to the lower end of the instrument is a flexure support member 46 supporting flexures coupled to the gimbal 48 which in turn supports the rotor 52 through the flexures 50 providing in effect the rotor suspension system described with respect to FIG. 2. In this particular embodiment the axes of the suspension system are not specifically offset to provide the spin coupling as described in the patent referred to. As before, sensors are provided through pick-off cores 54 and coils 56, and torquing is provided through torquer cores 58 and torquer coils 60. In addition to the stop member 62, there is also coupled to the shaft a flexure member 64 and a vibration absorber member 66 corresponding to members 30 and 32 respectively in FIG. 2. Thus, it may be seen that the present invention may be readily incorporated into instruments generally corresponding to those known in the prior art, preferably however together with a means for providing an effective compliant mount of the non-rotating portion of the spin bearings such as is shown in FIG. 3 and in my copending application to maximize the effectiveness of the vibration absorber of the present invention.

Figure 4:
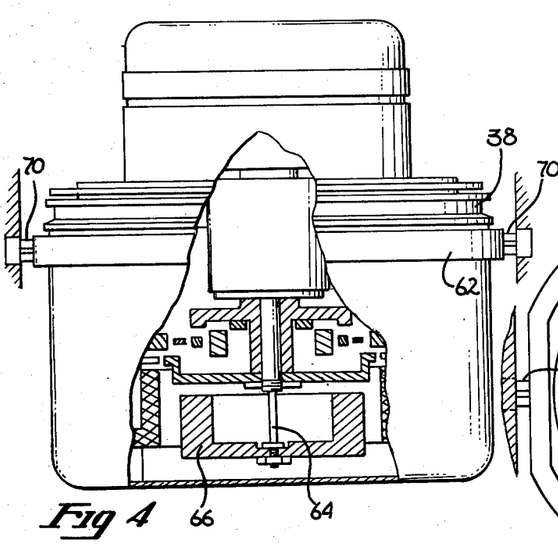
FIG. 4 is a partial cross-section of an instrument similar to that of FIG. 3, further illustrating the mounting of the instrument case so that the effective compliances of the nonrotating portion of the spin bearings are greatly reduced by the tuning of the instrument case with respect to the mounting thereof.
Figure 5:
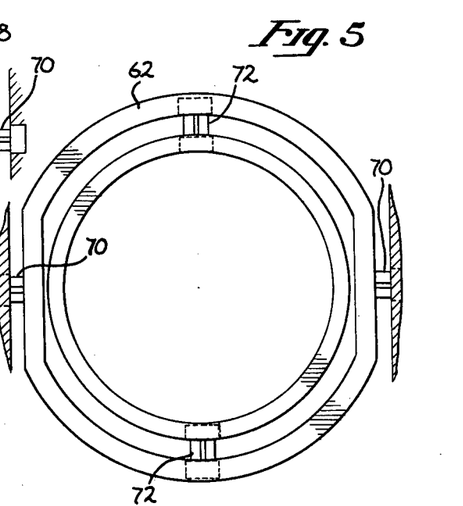
FIG. 5 is a top view of a portion of FIG. 4 illustrating the mounting of the instrument.

Now referring to FIGS. 4 and 5, an alternate form of the device generally in accordance with FIG. 3 may be seen. In this embodiment the desired means for reducing the restraint of the stationary portion of the spin bearings comprises an instrument mounting system having a gimbal-like member 62 supported about one axis on a stationary mount by an outer set of flexures 70 and in turn supporting the instrument case or frame 38 through an inner orthogonal set of flexures 72. By careful setting of the spring rates of the flexures 70 and 72 and the linear compliances of the various members, particularly the gimbal-like member 68, the linear and angular natural frequencies of the non-rotating portion of the case with respect to the outside world may be set at or near twice spin frequency so that the twice spin frequency components of bearing noise will excite the corresponding vibration of the instrument case rather than forcing the vibration onto the spin axis.

Figure 8:
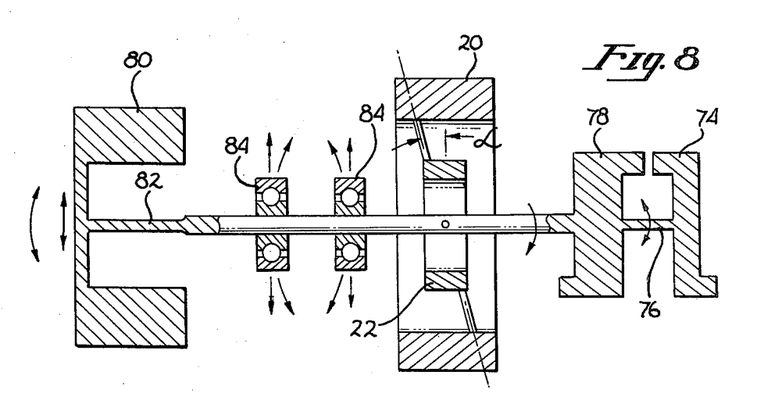
FIG. 8 is a schematic illustration of a device generally in accordance with the structure of FIG. 6.

Now referring to FIG. 8, a schematic diagram of an alternate embodiment of the present invention further incorporating the principles of spin coupling may be seen. The rotating assembly of this instrument includes a rotor assembly comprising a rotor 20 (see also FIGS. 1 and 2) supported from the gimbal 22 by an outer set of flexures 24 inclined from the orthogonal by an angle $\alpha$. (For convenience the inner set of flexures is on the orthogonal.) The rotating assembly also includes a product of inertia 78 rigidly coupled to the rotating assembly, and a counterbalancing product of inertia 74 mounted to the rotating assembly through a torsional spring 76 and tuned to the spin speed. In addition, the rotating assembly includes an inertia 80 coupled to the relatively rigid shaft by a region of reduced diameter 82. The region of reduced diameter 82 provides a predetermined torsional spring rate along any axis perpendicular to the spin axis, thereby allowing the axis of the inertia 80 to deviate from coaxial alignment with the axis of the remaining rotating assembly with a specified spring rate.

Since the spring 82 as well as the inertia 80 are symmetrical, the spring rate of spring 82 and the inertia of inertia 80 about any axis perpendicular to the shaft spin axis and through the center of support provided by the spring 82 are equal. If, in addition the ratio of the spring rate of spring 82 and the inertias of the inertia wheel 80 are appropriately selected, (adjusted) in accordance with the equation hereinbefore given, the inertia wheel will act as a twice spin frequency (case fixed reference system) angular vibration absorber. When so tuned, a twice spin speed angular vibration torque on the shaft perpendicular to the spin axis caused by the spin bearings 84 will result in a vibration of the absorber wheel 80 so that the spring 82 will create a nearly equal and opposite torque on the shaft, thereby minimizing the motion of the shaft in response to the basic spin bearing vibratory input. To enhance the performance of the system, however, it is preferred to effectively soft mount the spin bearings 84 with respect to the instrument case 38, the soft mounting being shown schematically in FIG. 8. More particularly, the soft mounting to minimize the twice spin frequency angular vibration force on the shaft should be soft (e.g., complaint, or having reduced restraint) with respect to twice spin speed vibrations so as to allow the outer race of the spin bearings to vibrate at twice spin speed, rather than having the outer race retained so that the bearing noise is much more directly communicated to the inner race and shaft assembly. Furthermore, in this embodiment it is preferable for the bearing mounting to also be relatively soft in a radial direction with respect to twice spin speed linear vibration, since the twice spin speed linear vibration sensitivity caused by the mass unbalance of the rotor (for acceleration sensing) is not eliminated by the concepts of spin coupling. However, by also tuning members 80 to a twice spin speed translational natural frequency, in accordance with the equation previously given, this component may be grossly reduced. Since the soft mounting of the outer race of the spin bearing may be accomplished substantially at the spin bearings, there is little associated inertia for the bearing noise to drive.

Figures 6, 7:
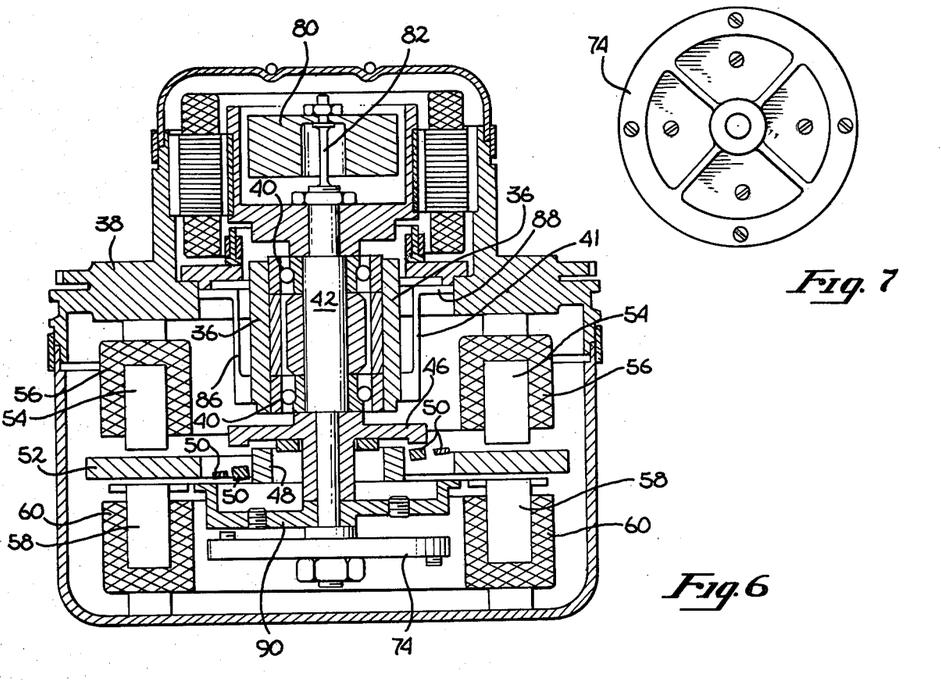
FIG. 6 is a cross-section of a typical instrument incorporating the present invention in an embodiment having a relatively soft mounting of the non-rotating portion of the spin bearings and further incorporating the principles of spin coupling.
FIG. 7 is an end view taken along the lines 7—7 of FIG. 6.

Now referring to FIG. 6, a partial cross section of a representative instrument utilizing the concepts of the embodiment of FIG. 8 may be seen. In this embodiment the lower portion of the rotor assembly is substantially the same as that shown in FIG. 3, and accordingly the various parts shown therein are similarly numbered (though of course the rotor suspension is inclined by the angle α). Stop 90 provides the product of inertia on the shaft with wheel 74, having spring spokes (see FIG. 7) for angular compliance, providing the tuning of member 74 about the spin axis to spin speed. The vibration absorber wheel 80 and spring 82 may be seen at the upper end of the rotor assembly. The bearing assembly comprises a tubular member 36 receiving the outer races of the two spin bearings and a spacer therebetween, with the member 36 being supported from the instrument case by a plurality of leg-like members having an axially oriented section 86 and a radially directed segment 88. With this arrangement, both translational and angular compliance is provided, so that the majority of the spin bearing noise results in vibration of the outer race assembly rather than the inner race assembly. A metallic support for the outer race assembly is preferred, so as to better and more repeatedly define the true spin axis position.

Figure 9:
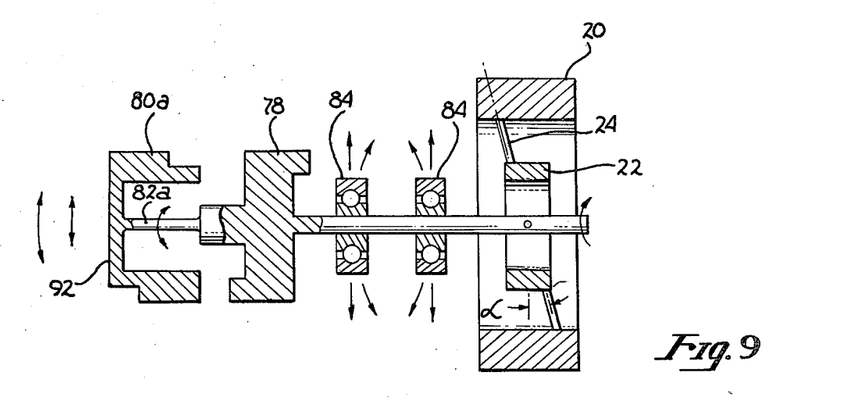
FIG. 9 is a schematic illustration of an embodiment similar to that of FIG. 6 and 8, though combining the balancing product of inertia and filter rotor of the present invention.

Now referring to FIG. 9, an alternate form of the basic embodiment of FIGS. 6 through 8 may be seen. In this embodiment the spring mounted product of inertia 74 of the embodiment of FIGS. 6 through 8 is combined with member 80 to provide a vibration absorber member 80a having the desired product of inertia. In such an embodiment the following tuning equations for member 80a should all be simultaneously met.

$$K_t = 4N^2 Ma \text{ (translation} \perp \text{spin)} \quad (2)$$

$$K_\theta = 2N^2(2A_2-C_2) \text{ (rotation} \perp \text{spin)} \quad (3)$$

$$K_S = N^2 C_2 \text{ (rotation about spin)} \quad (4)$$

Where: $K_S$ = the torsional spin rate of member 82a about the spin axis, and the other parameters are as hereinbefore defined.

In addition, of course, the center of support of member 82a and the center of mass of member 80a should coincide, at least axially, and radially also unless radial mass unbalance is injected for spin coupling purposes.

While there appears to be a large number of parameters which must be simultaneously adjusted, the relative independence of the various parameters allows relatively independent adjustment of each natural frequency with a reasonable number of adjustment screws. In particular, four equally spaced radial screws, preferably approximately in the plane of the center of gravity, and four equally spaced axial screws provide for all of the required adjustments. By adjusting the mass of the screws the translational natural frequency may be adjusted without adjusting the spring rate of member 82a. Adjustment of the radial screws in unison in the same direction (outward or inward) adjusts the polar moment of inertia $C_2$ without changing the center of gravity of the element, thereby providing adjustment for the tuning of member 80a about the spin axis to spin frequency. Finally, adjustment of the tuning of the natural frequency about axes perpendicular to the spin axis to twice spin frequency may be accomplished by adjustment of two of the axial screws inward and two of the axial screws outward, which adjusts the transverse moment of inertia $A_2$ without changing the polar amount of inertia or the center of gravity of member 80a. Depending upon which screws are adjusted inward and which screws are adjusted outward, the product of inertia of member 80a may also be adjusted as desired. (Some torsional compliance about the spin axis may need to be built into end plate 92 of member 80a such as, by way of example, is done in member 74 of FIG. 6 and 7, to bring the natural frequency of member 80a in rotation about the spin axis into the right adjustment range for the desired proportions of member 80a).

Figure 10:
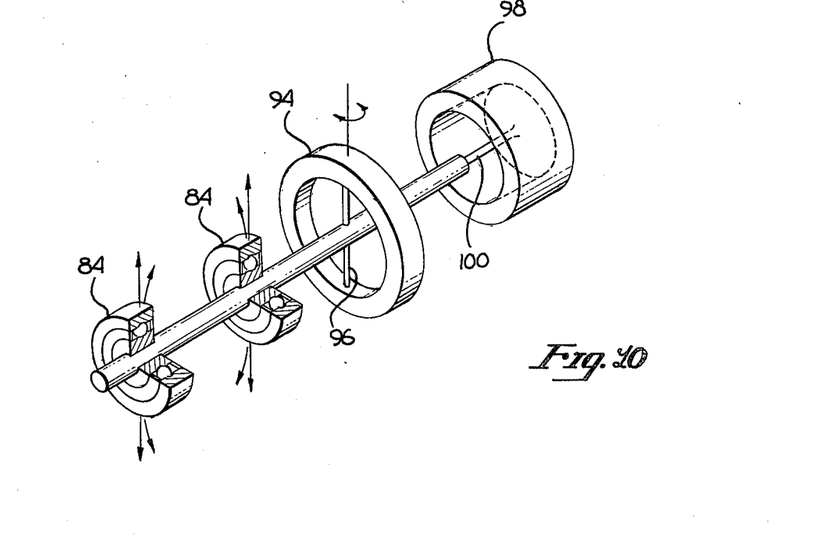
FIG. 10 is a perspective schematic of the present invention as applied to another typical prior art tuned rotor suspension system.

The embodiments hereinbefore described use a basic suspension system of FIG. 1, with or without spin coupling. In either event, the preferred form utilizes an inertially unsymmetrical rotor, typically comprised of alternate quadrants of high and low density material, having an axial mass unbalance, and a suspension system tuned to twice spin frequency. Such embodiments provide highly accurate two axis angular rate and two axis linear acceleration information from the single rotor. The present invention, however, is also applicable generally to other types of tuned suspension systems such as, by way of example, is shown in FIG. 10. In this system a rotor 94 is supported on a single axis spring flexure 96 so as to be capable of oscillating about the flexure axis. Such suspension systems are generally tuned to spin speed in the rotating system, making them sensitive to case fixed zero frequency and twice spin frequency inputs. As before, by mounting bearings 84 so that the stationary portions thereof have a substantial effective compliance and by providing a vibration absorber element 98 supported on spring member 100 tuned as hereinbefore described, a substantial portion of the twice spin speed vibration of the rotating portion may be absorbed by element 98, thereby grossly reducing the errors hereinbefore experienced with this type of rotor suspension system. If the rotor is intentionally unbalanced along the spin axis to provide for linear acceleration sensitivity, tuning of the translational natural frequency of member 98 along axes perpendicular to the spin axis at twice spin frequency should be included, though probably is not important if an axially balanced rotor is used. Obviously the suspension system of FIG. 10 is but one example of other types of suspension systems, the performance of which will be grossly improved by the inclusion of the present invention. Thus, while the present invention has been disclosed and described specifically with respect to one type of suspension system and an exemplary form of another system has also been disclosed and described, it will be understood by those skilled in the art that the present invention may also be used with still other tuned suspension systems, and that various changes in form and detail of the invention may be made without departing from the spirit and scope of the invention.

I claim:

1. In a tuned inertial sensor having a shaft supported from a frame by at least one bearing for rotation about a spin axis at a predetermined spin speed and a sensitive element and a sensitive element support system coupling the sensitive element to the shaft so as to allow relative motion between the sensitive element and the shaft, apparatus for reducing the inertial sensor sensitively to twice spin speed angular vibrations comprising:

a filter rotor means disposed substantially coaxial with said spin axis; and spring suspension means for coupling said filter rotor to said shaft so as to rotate therewith, said spring suspension means being a means for allowing spring restrained rotation of said filter rotor with respect to said shaft about axes perpendicular to said spin axis, the combination of said filter rotor means and said spring suspension means being tuned so that one of the natural frequencies of said filter rotor about axes perpendicular to said spin axis is substantially equal to twice spin speed when said shaft and said filter rotor means are rotating at spin speed, said one of the natural frequencies of said filter rotor being uncaged and substantially undamped.

2. The apparatus of claim 1 wherein the combination of said filter rotor means and said spring suspension means are tuned so that the upper natural frequency of said filter rotor about axes perpendicular to said spin axis is substantially equal to twice spin speed when said shaft and said filter rotor means are rotating at spin speed.

3. The apparatus of claim 2 wherein the lower natural frequency of said filter rotor about axes perpendicular to said spin axis is approximately equal to seventy percent of spin speed when said shaft and said filter rotor means are rotating at spin speed.

4. The apparatus of claim 1 wherein said spring suspension means is also a means for allowing spring restrained translation of said filter rotor means with respect to said shaft along axes perpendicular to said spin axis, the combination of said filter rotor and said spring suspension means being tuned so that the translational natural frequency of said filter rotor along axes perpendicular to said spin axis is substantially equal to twice spin speed, said translational natural frequency of said filter rotor being substantially undamped.

5. The apparatus of claim 4 wherein the center of suspension of said filter rotor means provided by said spring suspension means is substantially coincident with the center of gravity of said filter rotor means.

6. The apparatus of claim 1 wherein the moments of inertial of said filter rotor means about different axes perpendicular to said spin axis and passing through the center of gravity of said filter rotor are all substantially equal; and wherein the spring rates or said spring suspension means about different axes perpendicular to said spin axes and passing through the center of gravity of said filter rotor means are all substantially equal.

7. The apparatus of claim 6 wherein the center of suspension of said filter rotor means provided by said spring suspension means is substantially coincident with the center of gravity of said filter rotor means.

8. The apparatus of claim 1 further comprised of bearing support means for reducing the apparent angular restraint of the non-rotating portion of said at least one bearing with respect to said frame about axes generally perpendicular to said spin axis.

9. The apparatus of claim 8 wherein said spring suspension means is also a means for allowing spring restrained translation of said filter rotor means with respect to said shaft along axes perpendicular to said spin axis, the combination of said filter rotor and said spring suspension means being tuned so that the translational natural frequency of said filter rotor along axes perpendicular to said spin axis is substantially equal to twice spin speed, said translational natural frequency of said filter rotor being substantially undamped, said bearing support means further being a means for reducing the apparent linear restraint of the non-rotating portion of said at least one bearing with respect to said frame along axes generally perpendicular to said spin axis.

10. The apparatus of claim 9 wherein the center of suspension of said filter rotor means provided by said spring suspension means is substantially coincident with the center of gravity of said filter rotor means.

11. The apparatus of claim 1 wherein said sensitive element support system is non-orthogonally disposed with respect to said spin axis by a predetermined angle, and further comprised of an inertia coupled to said shaft for providing a product of inertial about said spin axis and an axis perpendicular to said spin axis.

12. The instrument of claim 11 further comprised of means for dynamically balancing the rotating assembly, said means for dynamically balancing the rotating assembly comprising a balancing inertia means having a product of inertia selected to make the net product of inertia of the rotating assembly substantially equal to zero, said means for dynamically balancing the rotating assembly being coupled to said shaft through a torsional spring having a torsion axis substantially parallel with said spin axis so as to provide a resonant frequency with respect to said shaft about said torsion axis substantially equal to the spin frequency.

13. The apparatus of claim 12 wherein said spring suspension means is also a means for allowing spring restrained translation of said filter rotor means with respect to said shaft along axes perpendicular to said spin axis, the combination of said filter rotor and said spring suspension means being tuned so that the translational natural frequency of said filter rotor along axes perpendicular to said spin axis is substantially equal to twice spin speed, said translational natural frequency of said filter rotor being substantially undamped.

14. The apparatus of claim 13 wherein the center of suspension of said filter rotor means provided by said spring suspension means is substantially coincident with the center of gravity of said filter rotor means.

15. The apparatus of claim 14 further comprised of bearing support means for reducing the apparent angular restraint of the non-rotating portion of said at least one bearing with respect to said frame about axes generally perpendicular to said spin axis.

16. In a tuned inertial sensor having a shaft supported from a frame by at least one bearing for rotation about a spin axis at a predetermined spin speed and a sensitive element support system coupling a sensitive element to the shaft so as to allow relative motion between the sensitive element and the shaft and to provide a predetermined axial pendulosity of the sensitive element, apparatus for reducing the inertial sensor sensitively to twice spin speed angular vibrations comprising:
a filter rotor means disposed substantially coaxial with said spin axis; and
spring suspension means for coupling said filter rotor means to said shaft so as to rotate therewith, said spring suspension means being a means for allowing spring restrained translation of said filter rotor means with respect to said shaft along axes perpendicular to said spin axis, the combination of said filter rotor means and said spring suspension means being tuned so that the translational natural frequency of said filter rotor along axes perpendicular to said spin axis is substantially equal to twice spin speed, said translational natural frequency of said filter rotor being substantially undamped.

17. The apparatus of claim 16 wherein the center of suspension of said filter rotor means provided by said spring suspension means is substantially coincident with the center of gravity of said filter rotor means.

18. The apparatus of claim 17 wherein said bearing support means is a means for reducing the apparent linear restraint of the non-rotating portion of said at least one bearing with respect to said frame along axes generally perpendicular to said spin axis.

19. The apparatus of claim 17 wherein said spring suspension means is also a means for allowing spring restrained rotation of said filter rotor with respect to said shaft about axes perpendicular to said spin axis, the combination of said filter rotor means and said spring suspension means being tuned so that one of the natural frequencies of said filter rotor about axes perpendicular to said spin axis is substantially equal to twice spin speed when said shaft and said filter rotor means are rotating at spin speed, said one of the natural frequencies of said filter rotor being uncaged and substantially undamped.

20. The apparatus of claim 19 wherein the combination of said filter rotor means and said spring suspension means are tuned so that the upper natural frequency of said filter rotor about axes perpendicular to said spin axis is substantially equal to twice spin speed when said shaft and said filter rotor means are rotating at spin speeds.

21. The apparatus of claim 20 wherein the lower natural frequency of said filter rotor about axes perpendicular to said spin axis is approximately equal to seventy percent of spin speed when said shaft and said filter rotor means are rotating at spin speed.

22. The apparatus of claim 21 further comprised of bearing support means for reducing the apparent angular restraint of the non-rotating portion of said at least one bearing with respect to said frame about axes generally perpendicular to said spin axis.

23. An inertial instrument comprising:
a shaft means supported on bearings for rotation about a spin axis at a predetermined spin frequency;
a rotor having first, second and third orthogonal principal axes, said third principal axis being approximately aligned with said spin axis, said rotor having substantially different moments of inertia about said first and second principal axes;
a rotor suspension means for coupling said rotor to said shaft, said rotor suspension means having first and second torsional spring rates about first and second rotor suspension means axes respectively, said rotor having a predetermined pendulosity along said first principal axis with respect to the center of support of said suspension means;
a filter rotor means disposed substantially coaxial with said spin axis; and
filter rotor spring suspension means for coupling said filter rotor to said shaft so as to rotate therewith, said filter rotor spring suspension means being a means for allowing spring restrained rotation of said filter rotor with respect to said shaft about axes perpendicular to said spin axis, the combination of said filter rotor means and said filter rotor spring suspension means being tuned so that one of the natural frequencies of said filter rotor about axes perpendicular to said spin axis is substantially equal to twice spin speed when said shaft and said filter rotor means are rotating at spin speed, said one of the natural frequencies of said filter rotor being uncaged and substantially undamped,
said filter rotor spring suspension means also being a means for allowing spring restrained translation of said filter rotor means with respect to said shaft along axes perpendicular to said spin axis, the combination of said filter rotor and said filter rotor spring suspension means being tuned so that the translational natural frequency of said filter rotor along axes perpendicular to said spin axis is substantially equal to twice spin speed, said translational natural frequency of said filter rotor being substantially undamped.

24. The instrument of claim 23 further comprised of means for reducing the apparent angular and linear restraint of the non-rotating portion of said bearings about and along axes generally perpendicular to said spin axis.

25. The apparatus of claim 23 wherein said rotor support system is non-orthogonally disposed with respect to said spin axis by a predetermined angle and further comprised of an inertia coupled to said shaft for providing a product of inertia about said spin axis and an axis perpendicular to said spin axis.

26. The instrument of claim 25 further comprised of means for dynamically balancing the rotating assembly, said means for dynamically balancing the rotating assembly comprising a balancing inertia means having a product of inertia selected to make the net product of inertia of the rotating assembly substantially equal to zero, said means for dynamically balancing the rotating assembly being coupled to said shaft through a torsional spring having a torsion axis substantially parallel with said spin axis so as to provide a resonant frequency with respect to said shaft means about said torsion axis substantially equal to the spin frequency.

27. The instrument of claim 23 wherein the combination of said filter rotor means and said filter rotor spring suspension means are tuned so that the upper natural frequency of said filter rotor about axes perpendicular to said spin axis is substantially equal to twice spin speed when said shaft and said filter rotor means are rotating at spin speed.

28. The instrument of claim 23 wherein the combination of said rotor and said rotor suspension means are tuned to twice spin-speed when rotating about said spin axis at a predetermined spin speed, and further comprised of means for caging the responses of said rotor centered around zero frequency and around twice spin frequency.

* * * * *